US010750028B2

(12) United States Patent
Roman et al.

(10) Patent No.: US 10,750,028 B2
(45) Date of Patent: Aug. 18, 2020

(54) MOBILE COMMUNICATIONS WITH QUALITY OF SERVICE

(71) Applicant: TEXTNOW, INC., Waterloo (CA)

(72) Inventors: Alexandru Gabriel Roman, Kitchener (CA); Armando Mauricio Murga, Waterloo (CA)

(73) Assignee: TEXTNOW, INC., Waterloo (CA)

( * ) Notice: Subject to any disclaimer, the term of this patent is extended or adjusted under 35 U.S.C. 154(b) by 0 days.

(21) Appl. No.: 16/020,793

(22) Filed: Jun. 27, 2018

(65) Prior Publication Data

US 2019/0007557 A1 Jan. 3, 2019

Related U.S. Application Data

(60) Provisional application No. 62/526,788, filed on Jun. 29, 2017.

(51) Int. Cl.
*H04M 7/00* (2006.01)
*H04M 3/22* (2006.01)
(Continued)

(52) U.S. Cl.
CPC ....... *H04M 7/0057* (2013.01); *H04M 3/2227* (2013.01); *H04M 15/00* (2013.01); *H04M 15/56* (2013.01); *H04M 15/8044* (2013.01); *H04M 15/8055* (2013.01); *H04M 15/8061* (2013.01); *H04W 36/30* (2013.01); *H04W 48/18* (2013.01);
(Continued)

(58) Field of Classification Search
USPC ........................................................ 370/252
See application file for complete search history.

(56) References Cited

U.S. PATENT DOCUMENTS 6,707,813 B1   3/2004 Hasan et al.
6,917,587 B1 * 7/2005 Sarkar ................. H04M 3/2254
                                                  370/230
(Continued)

FOREIGN PATENT DOCUMENTS

WO   WO-2007016695 A2   2/2007

OTHER PUBLICATIONS

Westbay Engineers Limited, Tool: Erlang Cat Minutes Calculator, http://www.erlang.com/calculator/mins/, Jan. 7, 2014. Retrieved on Oct. 9, 2014.
(Continued)

*Primary Examiner* — Natasha W Cosme
(74) *Attorney, Agent, or Firm* — Perry + Currier Inc.

(57) ABSTRACT

A mobile communications system includes switching between communication paths based on the quality of service. A VoIP service is coupled to a mobile network and a wireless local-area network (WLAN) via a wide-area IP network. A plurality of mobile communications devices are associated with VoIP telephone numbers. A public switched telephone network (PSTN) is coupled to the plurality of mobile communications devices and coupled to the VoIP service. A quality of service server is coupled to the plurality of mobile communications devices via the wide-area IP network for determining the quality of data channels to a mobile communications device via the mobile network and to the mobile communications device via the WLAN. A voice call is carried over one of the mobile network, the WLAN, and the PSTN depending on the quality of the data channels.

17 Claims, 5 Drawing Sheets

(51) Int. Cl.
*H04W 36/30* (2009.01)
*H04W 48/18* (2009.01)
*H04M 15/00* (2006.01)
*H04W 36/14* (2009.01)
*H04W 36/00* (2009.01)

(52) U.S. Cl.
CPC .. *H04M 7/0075* (2013.01); *H04M 2215/7464* (2013.01); *H04W 36/0022* (2013.01); *H04W 36/14* (2013.01)

(56) References Cited

U.S. PATENT DOCUMENTS

| | | | |
|---|---|---|---|
| 7,039,027 B2* | 5/2006 | Bridgelall | H04W 36/04 370/329 |
| 7,046,658 B1 | 5/2006 | Kundaje et al. | |
| 7,266,113 B2 | 9/2007 | Wyatt | |
| 7,274,950 B2 | 9/2007 | Castrogiovanni et al. | |
| 7,310,415 B1 | 12/2007 | Short | |
| 7,489,687 B2 | 2/2009 | Chavez et al. | |
| 7,839,982 B2 | 11/2010 | Dalrymple et al. | |
| 7,899,174 B1 | 3/2011 | Constantinof | |
| 8,139,564 B1 | 3/2012 | Weaver et al. | |
| 8,315,589 B2 | 11/2012 | Li et al. | |
| 8,472,430 B2 | 6/2013 | Milstein et al. | |
| 8,559,601 B2 | 10/2013 | Coster et al. | |
| 8,897,746 B1 | 11/2014 | Tarantino | |
| 9,369,592 B1 | 6/2016 | Velusamy et al. | |
| 2002/0013849 A1 | 1/2002 | Schweitzer et al. | |
| 2002/0029189 A1 | 3/2002 | Titus et al. | |
| 2002/0176378 A1 | 11/2002 | Hamilton et al. | |
| 2002/0193093 A1 | 12/2002 | Henrikson et al. | |
| 2003/0133552 A1 | 7/2003 | Pillai et al. | |
| 2003/0233332 A1 | 12/2003 | Keeler et al. | |
| 2004/0008645 A1 | 1/2004 | Janevski et al. | |
| 2004/0102132 A1 | 5/2004 | Miller et al. | |
| 2006/0084410 A1 | 4/2006 | Sutaria et al. | |
| 2006/0116105 A1 | 6/2006 | Frankel et al. | |
| 2006/0193344 A1 | 8/2006 | Nie et al. | |
| 2006/0276170 A1 | 12/2006 | Radhakrishnan et al. | |
| 2007/0008937 A1 | 1/2007 | Mody et al. | |
| 2007/0043676 A1 | 2/2007 | Gao et al. | |
| 2007/0076696 A1 | 4/2007 | An et al. | |
| 2007/0094691 A1* | 4/2007 | Gazdzinski | H04N 7/17318 725/62 |
| 2007/0189220 A1 | 8/2007 | Oberle et al. | |
| 2007/0244752 A1 | 10/2007 | Bayne | |
| 2007/0253412 A1 | 11/2007 | Batteram et al. | |
| 2007/0254629 A1 | 11/2007 | Black et al. | |
| 2008/0114669 A1 | 5/2008 | O'Neil et al. | |
| 2008/0127320 A1 | 5/2008 | De Lutiis et al. | |
| 2008/0181179 A1 | 7/2008 | Karaoguz | |
| 2008/0281695 A1 | 11/2008 | Whitehead | |
| 2009/0075627 A1 | 3/2009 | Hwang et al. | |
| 2009/0262716 A1 | 10/2009 | Kawakami | |
| 2010/0041369 A1 | 2/2010 | Narayan et al. | |
| 2010/0177662 A1 | 7/2010 | Meincke et al. | |
| 2011/0038468 A1 | 2/2011 | Hannan et al. | |
| 2011/0040881 A1 | 2/2011 | Coulas et al. | |
| 2011/0081890 A1 | 4/2011 | Ahmadvand et al. | |
| 2011/0082779 A1 | 4/2011 | Wong et al. | |
| 2011/0196978 A1 | 8/2011 | Toyama et al. | |
| 2011/0199962 A1 | 8/2011 | Kahn et al. | |
| 2012/0130898 A1 | 5/2012 | Snyder et al. | |
| 2012/0173736 A1 | 7/2012 | Klein | |
| 2013/0045711 A1 | 2/2013 | Gao et al. | |
| 2013/0310030 A1 | 11/2013 | Ventimiglia et al. | |
| 2013/0316703 A1 | 11/2013 | Girard et al. | |
| 2013/0343246 A1 | 12/2013 | Manyakin, Jr. et al. | |
| 2014/0002576 A1 | 1/2014 | Kaza et al. | |
| 2014/0003405 A1 | 1/2014 | Gillett et al. | |
| 2014/0031003 A1 | 1/2014 | Shugart et al. | |
| 2014/0171019 A1 | 6/2014 | Chen et al. | |
| 2014/0211700 A1 | 7/2014 | Anson et al. | |
| 2014/0254574 A1 | 9/2014 | Schreuder | |
| 2014/0279438 A1 | 9/2014 | Reiff et al. | |
| 2014/0307589 A1 | 10/2014 | Li et al. | |
| 2015/0045074 A1 | 2/2015 | Wong et al. | |
| 2015/0073987 A1 | 3/2015 | Dutt | |
| 2015/0304201 A1 | 10/2015 | Onishi et al. | |
| 2015/0370858 A1 | 12/2015 | Lafuente Alvarez et al. | |
| 2015/0373478 A1 | 12/2015 | Ramraz et al. | |
| 2015/0381820 A1 | 12/2015 | Ting et al. | |
| 2016/0007236 A1 | 1/2016 | Roeland et al. | |
| 2016/0193364 A1 | 7/2016 | Rutter et al. | |

OTHER PUBLICATIONS

Vodafone, Support Article: Recharge your account to keep it active, http:/support.vodafone.com.au/articles/FAQ/What-happens-to-my-prepaid-service-if-I-don-t-recharge. Retreived on Oct. 9, 2014.

Packetizer, VoIP Bandwidth Calculator, http://www.bandcalc.com/, Feb. 17, 2008. Retrieved on Oct. 10, 2014.

USPTO, Notice of Allowance and Fee(s) Due, dated Dec. 7, 2016, re U.S. Appl. No. 14/314,209.

USPTO, Non-Final Rejection, dated Feb. 11, 2016, re U.S. Appl. No. 14/314,209.

Metropcs, Support and FAQs "Frequently Asked Questions: joyn Wi-Fi Calling", www.metropcs.com. Retrieved on Jan. 17, 2014.

Google Play Store, Onavo Count Data Usage App product page, https://playgoogle.com/store/apps/details?id=com.onavo.android.onavoid?hi=en, Sep. 9, 2014. Retrieved on Oct. 9, 2014.

USPTO, Final Rejection, dated Sep. 8, 2016, re U.S. Appl. No. 14/314,209.

FIDO, Support Article: Insufficient balance impacts, http://www.fido.ca/web/content/account/low_insufficient_balance_impacts. Retrieved on Oct. 9, 2014.

USPTO, Non-Final Rejection, dated Jun. 21, 2017, re U.S. Appl. No. 15/587,918.

USPTO, Notice of Allowance and Fee(s) Due, dated Feb. 13, 2017, re U.S. Appl. No. 14/747,543.

U.S. Appl. No. 14/314,209, Mobile Electronic Communications Using Internet Protocol, filed Jun. 25, 2014.

U.S. Appl. No. 15/445,601, Mobile Electronic Communications Using Internet Protocol, filed Feb. 28, 2017.

U.S. Appl. No. 14/747,543, Mobile Electronic Commcommunications With Grace Period, filed Jun. 23, 2015.

U.S. Appl. No. 15/587,918, Mobile Electronic Communications With Grace Period, filed May 5, 2017.

U.S. Appl. No. 16/222,085, Mobile Electronic Communications With Grace Period, filed Dec. 17, 2018.

Mobile Communications With Quality of Service.

* cited by examiner

MOBILE COMMUNICATIONS WITH QUALITY OF SERVICE

FIELD

The present disclosure relates to electronic communications.

BACKGROUND

Mobile communications technologies are continually evolving. It is common for wireless/mobile networks (e.g., cellular telephone networks) to support multiple different protocols and standards, as operators transition to newer technologies. Transition is gradual, and older technologies tend to stay in service to support users who lack the impetus or finances to upgrade to newer technologies. There are multitude of different technologies some of which are offered as paid services while others are offered as "free" services such as wi-fi access points by businesses offering free Internet access for its customers. The quality of service (QoS) of these services can be varied and may also change during an access session. It may be useful to switch from one service to another when the QoS drops.

SUMMARY

According to one aspect of the present disclosure, an electronic communications system includes a mobile network to provide communications between the plurality of mobile communications devices based and a wide-area IP network where mobile directory numbers are associated with the plurality of mobile communications devices; a wireless local-area network (WLAN) to provide communications between the plurality of mobile communications devices and a wide-area IP network; a VoIP service coupled to the mobile network and the WLAN via the wide-area IP network, where the plurality of mobile communications devices are associated with VoIP telephone numbers; a public switched telephone network (PSTN) coupled to the plurality of mobile communications devices and coupled to the VoIP service; a quality of service server coupled to the plurality of mobile communications devices via the wide-area IP network for determining the quality of data channels to a mobile communications device via the mobile network and to the mobile communications device via the WLAN; wherein a voice call is carried over one of the mobile network, the WLAN, and the PSTN depending on the quality of the data channels.

According to another aspect of the present disclosure, a voice call is initiated between a Voice over Internet Protocol (VoIP) service coupled to a mobile network and a wireless local-area network (WLAN) via a wide-area internet protocol (IP) network and a mobile communications device. A quality of a second data channel from the VoIP service to the mobile communications device via the WLAN is determined. A designated channel is selected from a first data channel from the VoIP service to the mobile communications device via the mobile network, the second data channel, and a voice channel from the VoIP service to the mobile communications device via a public switched telephone network (PSTN). At the VoIP service, the voice call is established over the designated channel.

BRIEF DESCRIPTION OF THE DRAWINGS

The drawings illustrate, by way of example only, implementations of the present disclosure.

DETAILED DESCRIPTION

The present disclosure generally relates to providing wireless carrier services (e.g., voice calls, short message service or SMS messages, general data communications, etc.) with quality of service. While certain infrastructure may not operate under Internet Protocol (IP) (e.g., PSTNs, cellular base station networks, etc.), communications are routed to and from such infrastructure using IP to the extent possible. The present disclosure also generally relates to providing communications with QoS between communication devices operating under the same account, and tracking and managing prepaid balances for traditional carrier services (e.g., voice call minutes, SMS messages, etc.) that are routed, an may be delivered, over IP. Other aspects of the present disclosure will also become apparent in light of the following detailed description.

Figure 1:
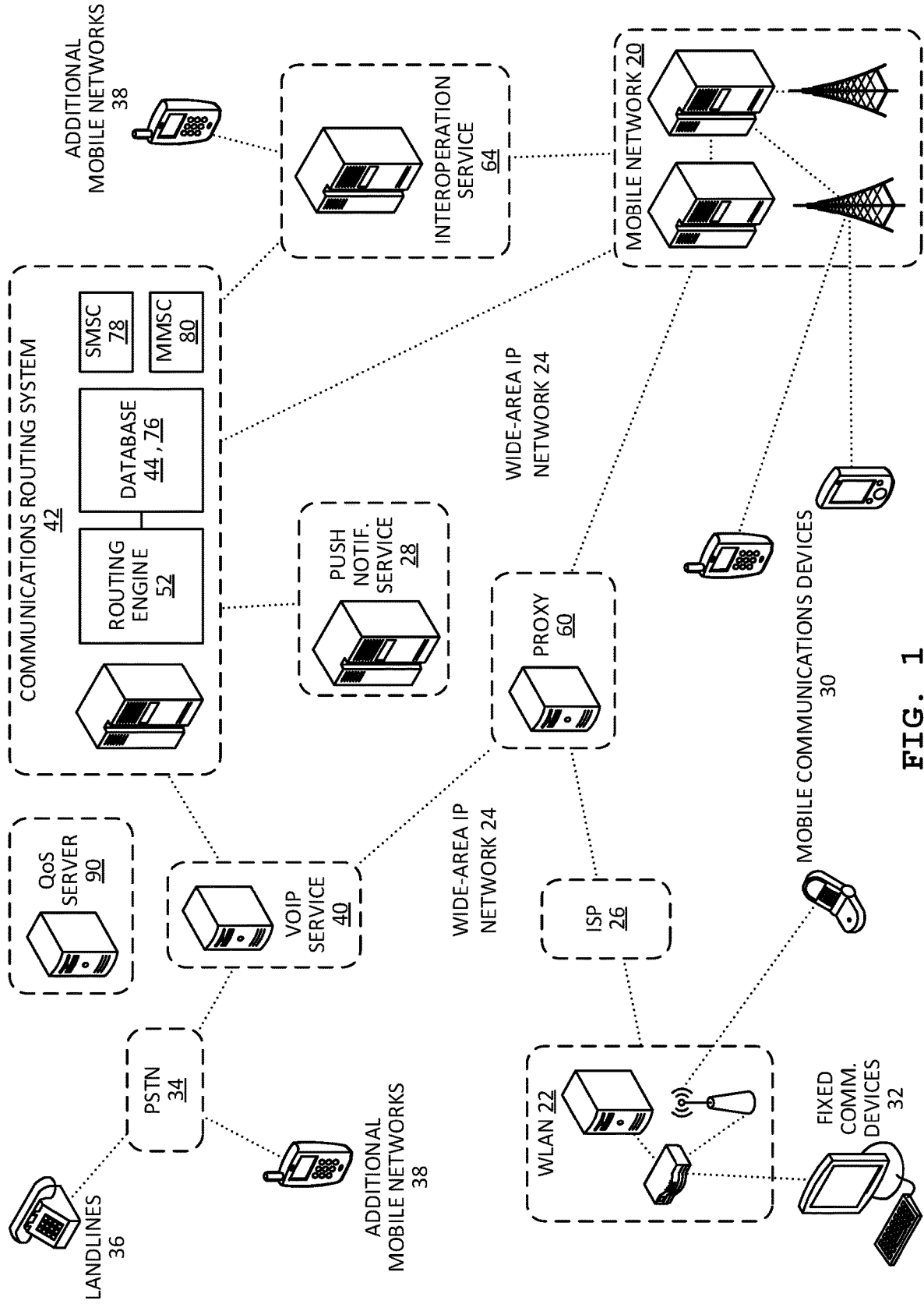
FIG. 1 is a schematic diagram of an overall communications system.

FIG. 1 shows an example of an overall electronic communications system.

The system includes a mobile network 20, such as a wireless cellular network that operates under one or more known standards and technologies, such as Long Term Evolution (LTE), Worldwide Interoperability for Microwave Access (WiMAX), Enhanced Voice-Data Optimized (EVDO), Code Division Multiple Access (CDMA), HSPA (High Speed Packet Access), and similar. The mobile network 20 provides voice, data, and SMS services.

The system further includes at least one wireless local-area network (WLAN) 22 that operates under one or more known standards and technologies, such as IEEE 802.11.

The mobile network 20 and the WLAN 22 each connect to a wide-area IP network 24, such as the Internet. The WLAN 22 can be connected to the wide-area IP network 24 by an Internet service provider (ISP) 26 or the similar entity. The mobile network 20 can be connected to the wide-area IP network 24 by a packet data interface.

The system can further include a push notification service 28, such as the kind operated by Google Inc. of Mountain View, Calif., and Apple Inc. of Cupertino, Calif.

A plurality of mobile communications devices 30 can connect to the mobile network 20, via base stations and other infrastructure, and can further connect to the WLAN 22, via access points or similar. Examples of suitable mobile communications devices 30 include devices such as cellular telephones, smartphones, tablet computers, and the like that are provided with wireless communications interfaces suitable for the particular technologies used in the mobile network 20 and the WLAN 22. For sake of discussion it is assumed that all of the mobile communications devices 30 can connect to the mobile network 20 and WLAN 22. In various implementations, different mobile communications devices have different types of wireless communications interfaces, different configurations, and/or different access rights suitable for connection to different mobile networks and different WLANs.

For clarity of illustration, while FIG. 1 has dotted lines showing communication between certain parts of the system, all of the parts (such as WLAN 22 via ISP 26 and mobile network 20) connecting to the wide-area IP network 24 may be configured to communicate with each other. For example, dotted lines have not been included to show the communications of the Push Notification Service 28 with the plurality of mobile communications devices 30 via the mobile network 20 or the WLAN 22.

One or more stationary (fixed) communications devices 32, such as a desktop computer, laptop or wi-fi only device, server, or similar, can also connect to the WLAN 22, via a router or wired access point. For clarity, the term communications devices 30, 32 means mobile communications devices 30 and fixed communications devices 32.

The system can further be connected to a public switched telephone networks (PSTN) 34 that supports correction to a plurality of landline telephones 36 and additional mobile networks 38. The additional mobile networks 38 may have the same or similar features of the mobile network 20 and may be operated by different carriers and/or operated according to different technologies and standards when compared to the mobile network 20. For clarity, the mobile communications devices 30 connected to the mobile network 20 may also initiate to or receive voice calls directly from the PSTN 34 (which includes additional mobile networks 38) via the mobile network 20. Further, such voice calls, for example, may be via GSM (Global System for Mobile communication) from the mobile network 20. For convenience, such voice calls via the mobile network 20 in this disclosure are referred to as via a "voice channel". This is in contrast to VoIP voice calls using a "data channel" of the mobile network 20 such as the Packet Data Channel of GPRS (General Packet Radio Service).

The system further includes at least one voice-over-IP (VoIP) service 40, which can be configured to manage IP data streams related to VoIP communications (for example routing the IP data steam from communications device 30, 32 to another communications device 30, 32). All VoIP calls are steamed through the VoIP service 40. It also interfaces (transcoding as necessary) with the PSTN 34 and the additional mobile networks 38.

The VoIP service 40 may operate using one or more protocols, such as the Session Initiation Protocol (SIP), and one or more audio codecs, such as Opus. The VoIP service 40 can be connected to the PSTN 34 to allow VoIP calls to be place to and from landlines 36 and wireless devices in the additional mobile networks 38. One of the functions of the VoIP service 40 is to transcode the IP data streams so that it is compatible between different networks (for example between the mobile network 20 and the PSTN 34). In some implementations, the VoIP service 40 is a subcomponent of the mobile network 20 or the additional mobile networks 38.

The system further includes a communications routing system 42 connected to the VoIP service 40, the push notification service 28, and the mobile network 20 via the wide-area IP network 24. In some implementations, the VoIP service 40 is directly connected to the communications routing system 42 via a local IP network distinct from the wide-area IP network 24. The communications routing system 42 is configured to direct the routing of communications of disparate types between mobile communications devices 30 via the mobile network 20 and/or the WLAN 22, and further with communications devices (including landlines 36) of the PSTN 34 and the additional mobile networks 38 as needed.

The system can further include a proxy 60 connected to the communications routing system 42, the WLAN 22, and the mobile network 20 via the wide-area IP network 24. In some implementations, the communications routing system 42 and the mobile communications devices 30 can be configured to route communications events through the proxy 60. The proxy 60 can be configured to handle VoIP call handoffs, as an alternative to the communications routing system 42 handling such. In addition, the proxy 60 can be configured to prioritize communications events associated with the enhanced 911 system, as an alternative to the communications routing system 42 doing so. For example, the proxy 60 can control quality of service (QoS) settings for various communications, so that 911 calls are prioritized. In some implementations, the VoIP service 40 is configured to route all relevant VoIP data through the proxy 60. A suitable proxy service can be in the form of that available from Pravala Networks Inc., of Kitchener, Ontario, Canada.

The system can further include an interoperation service 64 connecting the communications routing system 42 to the mobile network 20 via the wide-area IP network 24. The communications routing system 42 can be connected to the interoperation service 64 via a virtual private network (VPN) established over the wide-area IP network 24. The interoperation service 64 is configured to interface with the various mobile networks 20, 38. The interoperation service 64 facilitates data communications between the communications routing system 42 and the mobile network 20. The interoperation service 64 further facilitates messaging services, such as SMS and MMS, between the communications routing system 42 and the additional mobile networks 38. The interoperation service 64 can be the kind provided by Syniverse of Tampa, Fla.

The communications routing system 42 includes at least one database, such as an accounts database 44 and one or more user data databases 76, configured to store a plurality of associations between unique account identifiers (e.g., user names) and mobile-network identifiers supported by the mobile network 20, such as mobile directory numbers (MDNs, or telephone numbers). For each user name, the database 44, 76 can store a first MDN for SMS/MMS messages and VoIP calls and a second MDN for services on the mobile network 20. The first and second MDNs are district and mutually different. The first MDN is used at the VoIP service 40 and the communications routing system 42 for VoIP calls. The first MDN is also used at the interoperation service 64 and communications routing system 42 for communicating SMS/MMS messages. In some implementations, the first MDNs are landline telephone numbers obtained from at least one competitive local exchange carrier (CLEC). The second MDN is used by the mobile network 20 to track data usage by each respective mobile communication device 30, with the communications routing system 42 using the second MDNs to map data usage to particular accounts. The database 44, 76 may further store push tokens to identify mobile communications devices 30 via the push notification service 28, so that the communications routing system 42 can send push notifications to the mobile communications devices 30. Alternatively or additionally, the database 44, 76 may store currently assigned IP addresses for the mobile communications devices 30.

In some embodiments, only the first (VoIP) MDN is used and the first MDN is registered with the mobile network 20 for data usage at the mobile network 20. For such embodiments, functionality described herein described with respect to the second (mobile network) MDN is performed using the first (VoIP) MDN.

The communications routing system 42 further includes a routing engine 52 responsive to incoming communications events. Incoming communications events can include initiation of voice calls, ending of voice calls, communication of SMS/MMS messages, requests for data. The routing engine 52 is further configured to route data communications between the plurality of mobile communications devices 30 over the mobile network 20 and the WLAN 22 using the Internet Protocol. The routing engine 52 is further configured to initiate and end voice calls between mobile communications devices 30 as VoIP calls using the VoIP server 40, and to communicate SMS messages between the plurality of mobile communications devices 30 via the mobile network 20 and the WLAN 22 using the Internet Protocol.

The communications routing system 42 can further include a short message service center (SMSC) 78 and a multimedia message service center (MMSC) 80 configured to store, forward, convert and deliver SMS and MMS messages between the communications routing system 42 and the interoperation service 64. The SMSC 78 and MMSC 80 can be configured to communicate with the interoperation service 64 using the Short Message Peer-to-Peer (SMPP) protocol.

Each mobile communications device 30 and fixed communications device 32 can be associated with one of the unique account identifiers (e.g., user names) stored in the database 44, 76. This can be achieved by, for example, a client program executed on the mobile communications device 30 requiring a user log in (e.g., client of FIG. 4). When a user is logged in to the client program, the mobile communications device 30 becomes associated with the respective unique account identifier.

Each account identifier can be associated with a second mobile-network identifier, such as a first MDN that is associated with the VoIP service 40. Each account identifier can be associated with a second mobile-network identifier, such as an MDN that is associated with mobile data access on the mobile network 20. In some implementations, the second MDN is only associated with mobile data access on the mobile network 20 to the exclusion of access to circuit-switched voice services and SMS/MMS services that may be available on the mobile network 20. The mobile network 20 uses the second MDN to track data usage of the mobile communications device 30, which can be reported to the communications routing system 42. Hence, for each account, voice services via the VoIP server 40 are conducted with one MDN and data services are conducted via the mobile network using a different MDN. The communications routing system 42 maps each MDN to a particular account for managing overall services to that account.

An outgoing voice call from a communications device 30, 32 is conducted as follows. The communications device 30, 32 sends a call request to the VoIP service 40 via the WLAN 22, if connected, or otherwise via the mobile network 20. The communications device 30, 32 registers with the VoIP service 40 if not already registered. If the destination device is on the PSTN 34, the VoIP service 40 completes the call via the PSTN 34. If the destination device has an account with the communications routing system 42, then the VoIP service 40 notifies the communications routing system 42 of the call request. The communications routing system 42 then issues a push notification to the destination device (if connected via mobile network 20, through the push notification service 28) to notify the destination device of the call. Then the destination device registers with the VoIP service 40, if not already registered, and notifies the VoIP service 40 of call acceptance. The VoIP service 40 can notify the communications routing system 42 of call initiation and ending. When the proxy 60 is used, VoIP voice data is routed through the proxy 60.

The mobile communications devices 30 can perform SIP registrations in a variety of ways.

For mobile communications devices 30 operating on iOS by Apple Inc., the mobile communication device 30 receiving a push notification does not immediately trigger SIP registration. Rather, the push notification informs the user of the incoming call, via an alert or similar. The user can then respond to the push notification by opening the client program, which then performs the SIP registration.

For mobile communications devices 30 operating on Android by Google Inc., the mobile communication device 30 can be configured to perform a SIP registration in response to receiving a push notification for an incoming call. That is, the SIP registration process can be started before the user has accepted the call.

Incoming voice calls to the communications devices 30, 32 arrive at the VoIP service 40 via the PSTN 34 (for example). Incoming voice calls may also arrive at the VoIP service 40 via the mobile network 20 or the WLAN 22. The VoIP service 40 notifies the communications routing system 42 of a call request for a particular destination communications device 30, 32. The communications routing system 42 then issues a push notification to the destination communications device 30, 32 (through the push notification service 28, where connected to the mobile network 20) to notify the destination communications device 30, 32 of the call. If the user of the destination communications device 30, 32 accepts the call, then the destination communications device 30, 32 registers with the VoIP service 40, if not already registered, and notifies the VoIP service 40 of call acceptance. The VoIP service 40 notifies the communications routing system 42 of call initiation and ending.

Incoming and outgoing voice calls made to or from a communications device 30, 32 associated with the communications routing system 42 are made using the first MDN, which is established at the VoIP service 40. When such a call is conducted as data via the mobile network 20, the second MDN of the relevant mobile communications device 30 is used to track the data usage on the mobile network 20.

In some embodiments, caller ID is based on the VoIP MDN to the exclusion of the mobile network MDN. That is, the mobile network MDN is for tracking data usage only, and the VoIP MDN is the basis for outgoing and incoming calls.

An outgoing SMS/MMS message can be sent by a communications device 30, 32 as follows. One or more IP data packets containing the SMS/MMS message are sent from the communications device 30, 32 to the communications routing system 42 via the WLAN 22, if connected, or otherwise via the mobile network 20. The sent data specifies a destination device using an MDN. The communications routing system 42 determines whether the MDN is stored in the database 44, 76 and thus whether the destination device is a communications device 30, 32 associated with the communications routing system 42. If the destination device is a communications device 30, 32 associated with the communications routing system 42, then the communications routing system 42 stores the message and sends a push notification to the destination communications device 30, 32 via the push notification service 28 (if connected via the mobile network 20). When a user at the destination communications device 30, 32 opens an SMS/MMS application/module or performs a similar action, the destination communications device 30, 32 fetches the stored message from the communications routing system 42. If the destination device is not associated with the communications routing system 42, then the communications routing system 42 sends the SMS/MMS message to the destination device via the interoperation service 64.

Incoming SMS/MMS messages for the communications devices 30, 32 arrive at the communications routing system 42 either directly from other communications devices 30, 32 that have accounts at the communications routing system 42 or via the interoperation service 64 for devices that are not associated with the communications routing system 42. The communications routing system 42 stores a particular SMS/MMS message and sends a push notification to the destination communications device 30, 32. When a user at the destination communications device 30, 32 opens an SMS/MMS application/module or performs a similar action, the destination communications device 30, 32 fetches the stored message from the communications routing system 42.

Incoming and outgoing SMS/MMS messages made to or from a mobile communications device 30 associated with the communications routing system 42 are made using the first MDN. When messages are sent as data through the mobile network 20, the second MDN of the respective mobile communications device 30 is used to track the data usage on the mobile network 20.

Data communications between communications devices 30, 32 and between communications devices 30, 32 and data sources, such as web sites connected to the wide-area IP network 24, are performed via the WLAN 22, if connected, and otherwise via the mobile network 20.

The system further comprises a quality of services (QoS) server 90. The QoS server 90 determines the performance of a data channel to a communications device 30, 32 for a voice call. Where the performance of the data channel to a communications device 30, 32 degrades or drops, the QoS server 90 directs the communication routing system 42 to establish a new channel to the communications device 30, 32 to continue the voice call. In the event that all data channels are degraded or terminated, then the QoS server 90 directs the communications routing system 42 to continue the voice call via a voice channel over the PSTN 34 (or mobile network 20) when the mobile communications device 30 is connected to the mobile network 20.

The QoS server 90 is shown as a standalone component in FIG. 1, however, it may be a subcomponent of another component such as the VoIP Service 40 and the communications routing system 42. The QoS server 90 is connected to the wide-area IP network 24 and as such a connection can be made with any of the communications devices 30, 32.

For further clarity, it will be understood that the mobile communications devices 30 may be simultaneously connected to both the mobile network 20 and the WLAN 22. While mobile network 20 may generally provide a better performing data channel then the WLAN 22 for voice calls, the WLAN 22 may provide the data channel free of charge to users.

Figure 2:
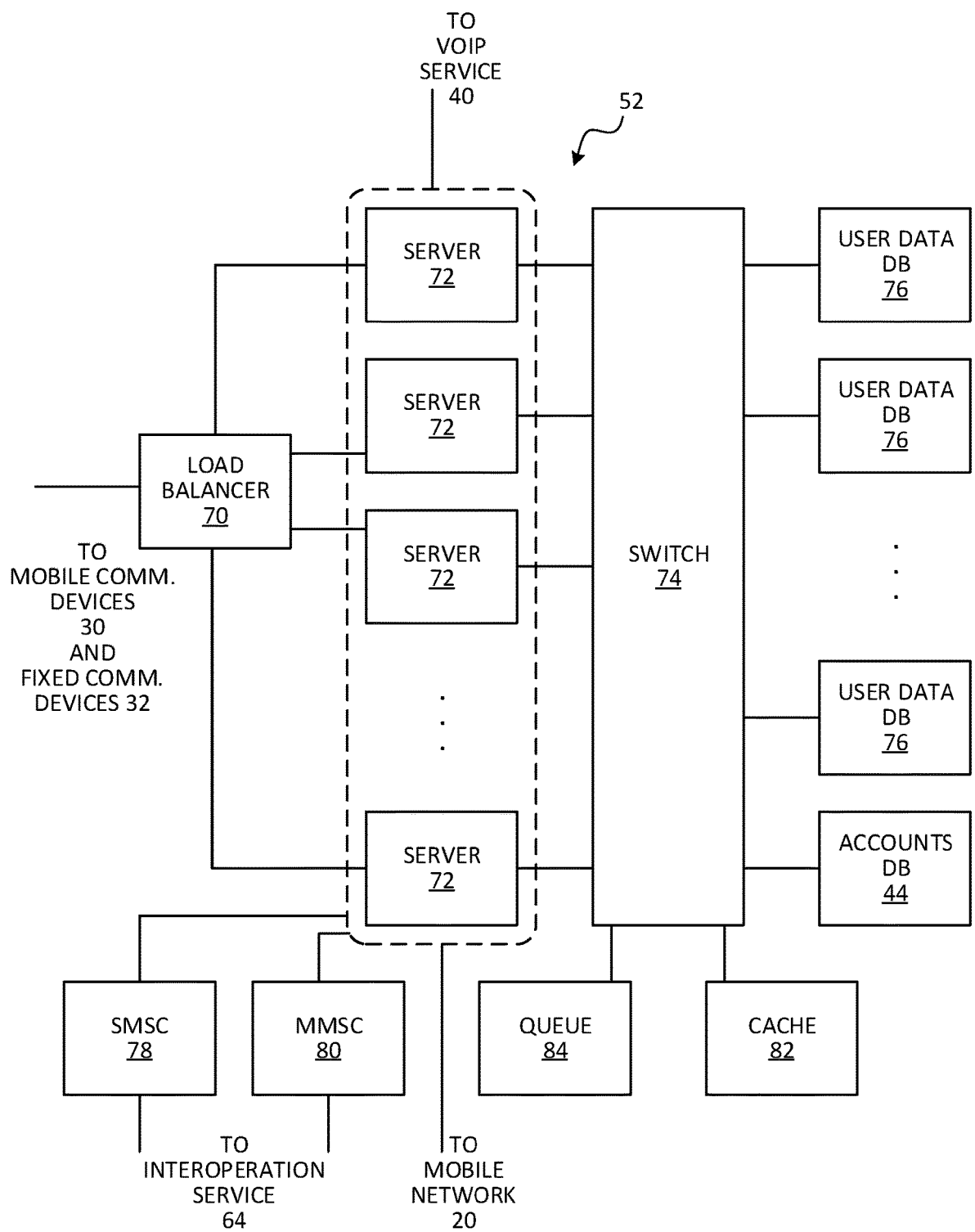
FIG. 2 is a schematic diagram of a communications routing system.

FIG. 2 shows a diagram of the communications routing system 42. The communications routing system 42 includes a load balancer 70, a plurality of servers 72, a switch 74, a plurality of user data databases 76, and the accounts database 44. The load balancer 70, servers 72, and switch 74 can be considered the routing engine 52. However, this is not limiting.

Communications devices 30, 32 connect to the load balancer 70 via the wide-area IP network 24 using a protocol, such as HTTP, HTTPS, or the like. The load balancer 70 is configured to balance requests from the communications devices 30, 32 among the servers 72.

The servers 72 are connected to the load balancer 70. The servers 72 can be configured to interface with the VoIP service 40 and the mobile network 20. The servers 72 can be clones having the same functionality. The servers 72 contain program code configured to interface with application programming interfaces (APIs) provided by the VoIP service 40 and the mobile network 20 and/or provide APIs for use by the VoIP service 40 and the mobile network 20. The servers 72 can be implemented using Nginx, PHP, and similar technology.

The SMSC 78 and the MMSC 80 are connected to the servers 72 and configured to store, forward, convert and deliver SMS and MMS messages between the servers 72 and the interoperation service 64 using, for example, the SMPP protocol and the MM4 protocol. The SMSC 78 and MMSC 80 can be configured to connect to the interoperation service 64 via a suitable binding and through a VPN tunnel. The SMSC 78 and MMSC 80 expose an API to the routing engine 52, such that the routing engine 52 can use the API to send outgoing SMS/MMS messages. For incoming messages, the SMSC 78 and MMSC 80 are configured to invoke an API of the routing engine 52 to cause the routing engine 52 to store a received message and send a notification of the message to the destination communications device 30, 32.

The switch 74 connects the servers 72 to the user data databases 76, the accounts database 44, a cache 82, and a queue 84.

The user data databases 76 store data for each of the users identified in the accounts database 44. Such user data can include the mobile network MDN, session ID, password, residential address, contacts, sessions, in-app purchases, subscriptions, settings, balance information, and communications events including call histories, SMS/MMS message transmission histories, and SMS/MMS message content. The user data databases 76 can be configured to store communications event histories for all user names in the accounts database 44, such that a particular user's history can be downloaded to any communications device 30, 32 with which the user logs in. The user data databases 76 can be implemented as database shards.

The cache 82 can be checked for data prior to requesting data from the user data databases 76. In addition, requests can be queued in the queue 84, which can be implemented using Redis or similar technology.

The accounts database 44 stores the identity 75 of the user data database 76 that stores the user data associated with each account identifier (user name), and can further store the VoIP MDN for each user.

Figure 3:
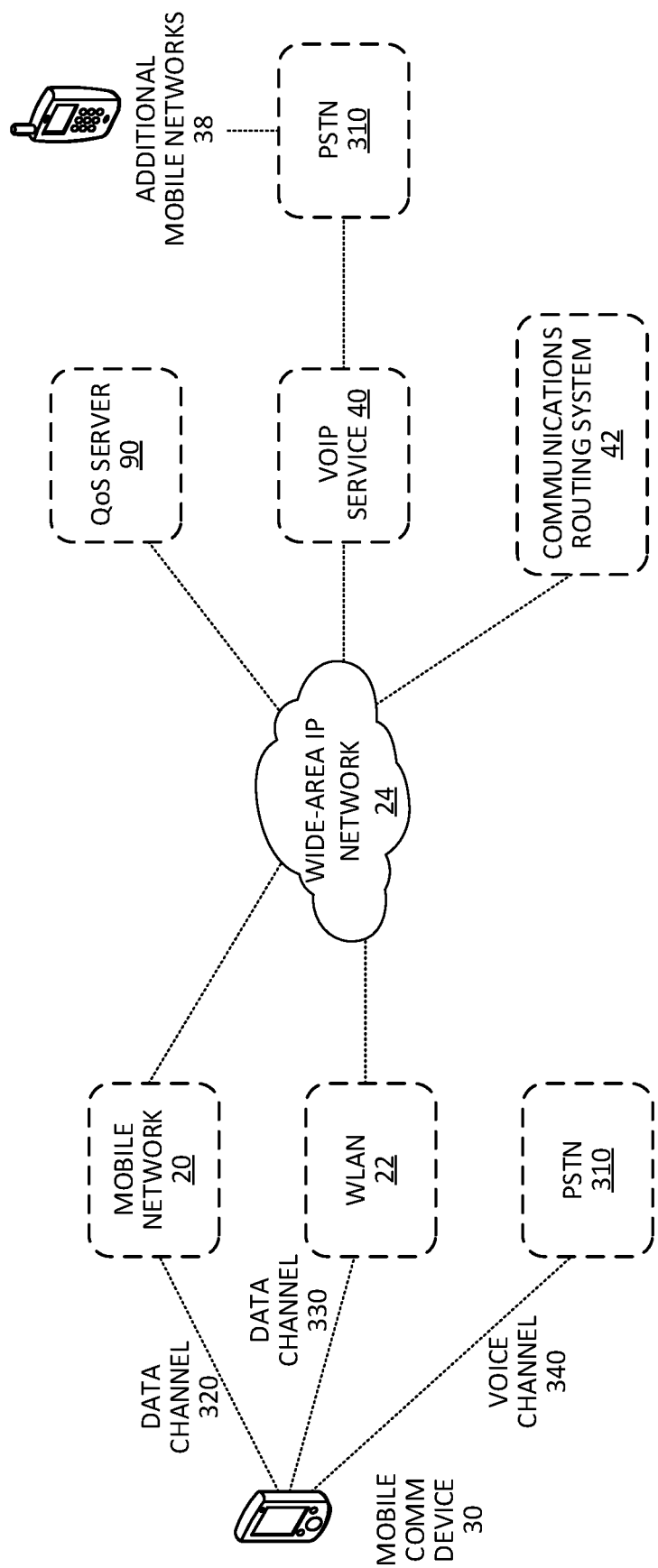
FIG. 3 is a diagram of the overall communication system with QoS as connected to mobile communications device according to one embodiment.

FIG. 3 shows a diagram of the overall communication system including the QoS server 90 connected to mobile communications device 30 (or communications device 30) via the wide-area IP network 24, according to one embodiment. The mobile communications device 30 is simultaneously connected to the WLAN 22 over a data channel 330 and the mobile network 20 over another data channel 320. The communications device 30 is connectable to a PSTN 310 over a voice channel 340 for voice calls. The PSTN 310 herein includes the voice channel of the mobile network 20, but alternatively, it may be a voice channel of another mobile network of a different carrier from that of the mobile network 20.

For an incoming voice call destined for the communications device 30, the incoming voice call is first received at the VoIP service 40 (for example, from PSTN 34 or additional networks 38) where the communication routing system 42 directs the routing of the voice call to the communications device 30.

Before the incoming voice call is established, the communications device 30 is notified of the incoming voice call and the communications device 30 starts sending packets (QoS test packets) to and receiving packets from the QoS Server 90 via the WLAN 22 data channel 330 and, optionally, via the mobile network 20 data channel 320. The data communication paths (data channels 320, 330) to the communications device 30 are thus tested. The performance of each of the data channels 320, 330 are determined based on the quality or performance of the channel: for example, latency, jitter, and loss of the received packets received at both the QoS server 90 and the communications device 30.

Based on the quality of the data channels 320, 330; the communication routing system 42 accordingly directs the establishment of the voice call to the better data channel.

Optionally, the determination may always use the data channel 330 (WLAN 22) for such voice calls when the quality is sufficient.

Where neither of the data channels 320, 330 are of sufficient quality or are not otherwise connected, the communication routing systems 42 accordingly directs the VoIP services 40 to route the voice over the PSTN 310 to establish the voice call.

For outgoing voice calls, a user first initiates the outgoing voice call. The data communication paths (data channels) 320, 330 to the communications device 30 are tested where the communications device 30 sends packets to and receives packets from the QoS server 90 via the WLAN 22 data channel 330 and, optionally, via the mobile network 20 data channel 320. The data communication paths (data channels 320, 330) to the communications device 30 are thus tested. The performance of each of the data channels 320, 330 are determined based on the quality or performance of the channel: for example, latency, jitter, and loss of the received packets received at both the QoS server 90 and the communications device 30.

Based on the quality of the data channels 320, 330; the communication routing system 42 accordingly directs the establishment of the outgoing voice call to the better data channel.

Optionally, the determination may always use the data channel 330 (WLAN 22) for such outgoing voice calls when the quality is sufficient.

Where neither of the data channels 320, 330 are of sufficient quality or are not otherwise connected; the mobile communications device 30 accordingly dials the PSTN 310 to connect to the VoIP Services 40, where the outgoing destination telephone number is dialed to establish the voice call. Optionally, the communications device 30 may just direct dial the destination telephone number over the PSTN 310.

This testing of the data channels 320, 330 may use, for example, 10 packets in each direction with the final packet (which could be a 11$^{th}$ packet) from the QoS server 90 indicating the quality of the packets received at the QoS Server 90. This testing of the data channels 320, 330 may occur periodically (such as every minute) through the duration of the voice call to, for example, gauge the quality of the other data channel not carrying the voice call.

Figure 4:
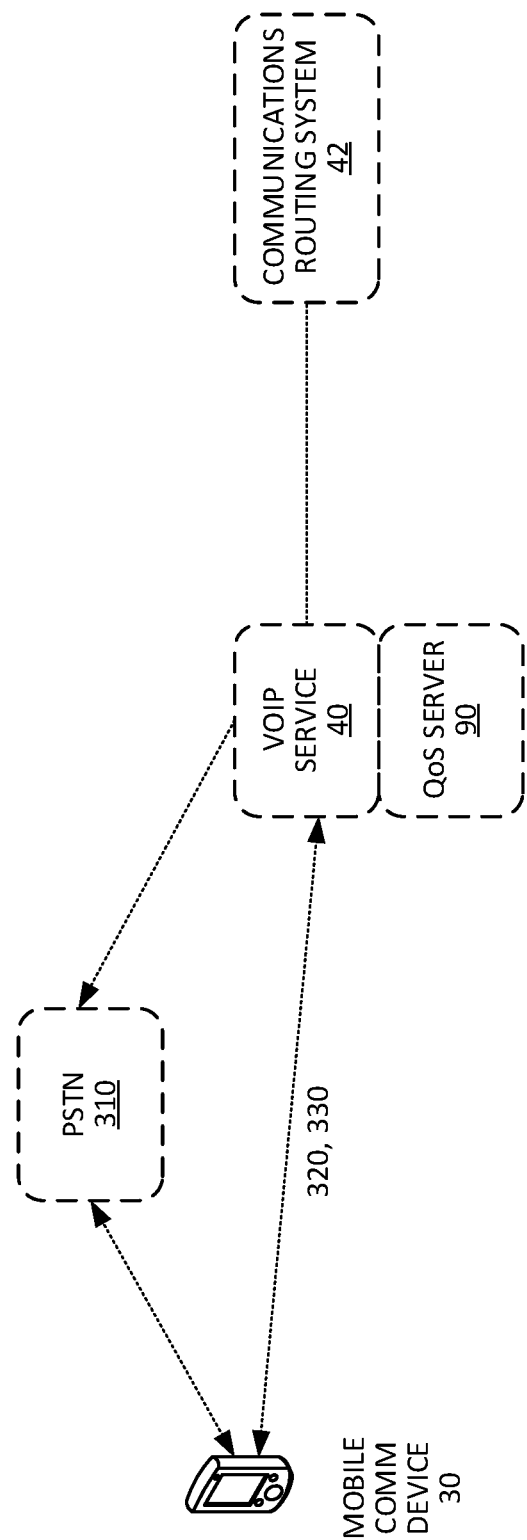
FIG. 4 is a diagram of the overall communication system with QoS as connected to communications device 30 according to a further embodiment of FIG. 3.

FIG. 4 shows a diagram of the overall communication system with QoS as connected to communications device 30 according to a further embodiment of FIG. 3. This is a further quality testing of the data channels. Once a voice call has been established over a data channel (either 320 or 330), for example, over the data channel 330 of WLAN 22; "heartbeat" packets are sent periodically (such as every second) over the data channel 330 between the communications device 30 and the QoS server 90 in order to monitor the quality of the data channel 330. If the data channel 330 degrades below a threshold or stops being received, then the QoS server 90 indicates to the VoIP service 40 (or via the communication routing system 42) to initiate a voice call over the PSTN 310 to the communications device 30 in order to continue the voice call. The voice call is place on the second MDN of the communications device 30.

For clarity, the data channels 320, 330 over the wide-area IP network are used to transport the heatbeat packets, the QoS test packets, and IP data streams of the voice calls (VoIP calls).

The QoS server 90 determines the quality of the data channel 330 based on factors such packet loss, packet latency and packet jitter. For voice calls established over data channel 320, the same process applies as with voice calls established over data channel 330.

Where the communication device 30 is simultaneously connected to the WLAN 22 and the mobile network 20, the voice call is established over one of the data channels 320, 330. The heartbeat packets are sent over both data channels 320, 330 and both are quality determined by the QoS server 90. When the data channel of the voice call degrades or drops, then the other data channel can be used to continue the voice call provided it has also not degraded or dropped. The QoS server 90 directs the VoIP service 40 to initiate voice call through the PSTN 310 if neither data channel 320, 330 is available or of sufficient quality.

The payload of the heartbeat packet includes status (such as start, stop, and continuing) and sequence. The status indicates to the QoS server 90 that a voice call has started and stopped. The stop status used to indicate that the voice call has ended and was not dropped by the network (so that a voice call to the communications device 30 is not initiated when the heartbeat packets end). The sequence (each packet is assigned a number indicating the order it was sent) that packets were received may indicate, for example, a degradation of the data channel if they were received out of order. As an example, the heartbeat packets may be sent every 0.5 seconds, and a voice call over PSTN 310 is initiated if two or more heatbeat packets are not received over one second, or if two or more heartbeat packets are received out of order.

Figure 5:
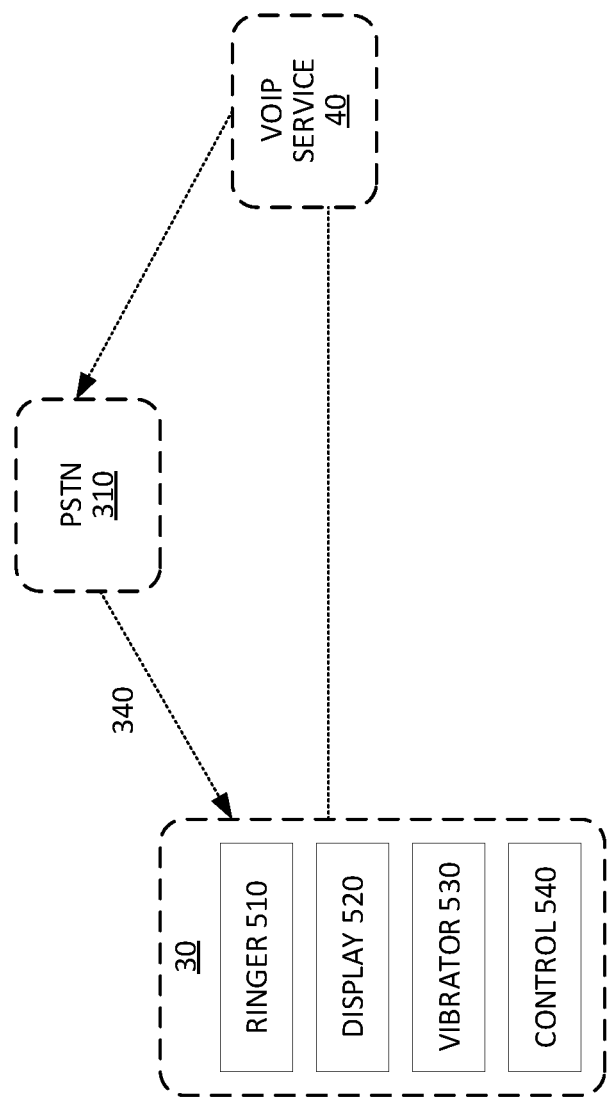
FIG. 5 is a diagram of the components of the mobile communications device of FIG. 3 and FIG. 4 accordingly to a further embodiment.

FIG. 5 shows a diagram of the components of the mobile communications device 30 of FIG. 3 and FIG. 4 accordingly to a further embodiment. The mobile communications device 30 comprises a ringer 510, display 520, vibrator 530, and a control module 540. When the mobile communications device 30 is connected to the VoIP Service 40 for a VoIP voice call (over one of the data channels 320, 330) and the data channels 320, 330 become degraded below a threshold of quality or is dropped (terminated/not available), then the VoIP Service 40 continues the voice call by connecting to the mobile communications device 30 via the PSTN 310 using the voice channel 340. However, for an improved user experience, this transfer of the voice call from the data channels 320, 330 to the voice channel 340 should be without any indication to the user.

During a voice call, the control module 540 automatically answers calls (telephone calls) from the VoIP Service 40 via the PSTN 310 while suppressing noticeable indications of a new call from the PSTN 310. The ringer 510 does not ring.

The vibrator 530 does not vibrate. The display 520 may optionally indicate that the voice call is now connected over the PSTN 310. The VoIP Service 40 calls the mobile communications device 30 via the PSTN 310 using the second MDN associated with the mobile communications device 30. The second MDN is generally not known or available to other parties except the VoIP Service 40. The control module 540 is configured to only automatically answer calls in this manner when the mobile communications device 30 is in a voice call which has not been terminated by the user or the other party.

Continuation of voice calls by transferring between one data channel to another data channel similarly suppresses noticeable indications of the new call, however, changing data channels may not cause any noticeable indications in most situations. Similarly, the display 520 may indicate a call transfer has occurred in the voice call.

The techniques discussed above show that evolving mobile network technologies, such as LTE, can be made available to prepaid users in a simplified, efficient, and efficient manner using the Internet Protocol. In addition, a reduced deployment of physical infrastructure is required. Further, more efficient spectrum usage can be realized.

While the foregoing provides certain non-limiting example implementations, it should be understood that combinations, subsets, and variations of the foregoing are contemplated. The monopoly sought is defined by the claims.

What is claimed is:

1. An electronic communications system comprising:
    a mobile network to provide communications between a plurality of mobile communications devices and a wide-area internet protocol (IP) network, wherein mobile directory numbers are associated with the plurality of mobile communications devices;
    a wireless local-area network (WLAN) to provide communications between the plurality of mobile communications devices and a wide-area IP network;
    a Voice over Internet Protocol (VoIP) service coupled to the mobile network and the WLAN via the wide-area IP network, wherein the plurality of mobile communications devices are associated with VoIP telephone numbers;
    a public switched telephone network (PSTN) coupled to the plurality of mobile communications devices and coupled to the VoIP service;
    a quality of service (QoS) server coupled to the plurality of mobile communications devices via the wide-area IP network for determining quality of: (i) a first data channel to the mobile communications device via the mobile network, (ii) a second data channel to the mobile communications device via the WLAN, and (iii) a voice channel to the mobile communications device via the PSTN; and
    a communications routing system coupled to (i) the mobile network, (ii) the WLAN via the wide area IP network and (iii) the QoS server, the communications routing systems configured to:
        obtain, from the QoS server, respective qualities of each of the first data channel, the second data channel, and the voice channel;
        select a designated channel from the first data channel, the second data channel, and the voice channel based on the respective qualities of the first data channel, the second data channel, and the voice channel; and
        route a voice call over the designated channel.

2. The system of claim 1, wherein the QoS server is configured determine a quality of a data channel to the mobile communications device via the WLAN based on at least one of: data packet loss, data packet latency, and data packet jitter.

3. The system of claim 2 wherein the QoS server is further configured to determine a quality of another data channel to the mobile communications device via the mobile network.

4. The system of claim 1, wherein the communications routing system is configured select the second data channel to the mobile communications device via the WLAN as the designated channel when the quality of the second data channel to the mobile communications device via the WLAN exceeds a pre-determined threshold value.

5. The system of claim 4, wherein the communications routing system is configured to select as the designated channel the data channel having higher quality.

6. The system of claim 4, wherein the communications routing system is configured to select the voice channel via the PSTN as the designated channel when the quality of data channels does not meet a pre-determined threshold value.

7. The system of claim 4, wherein when the voice call has been established over the designated channel, the QoS server is further configured to send and receive heartbeat packets over the designated channel periodically during the voice call and to determine a real-time quality of the designated channel based on at least one of: heartbeat packet loss, heartbeat packet latency, and heartbeat packet jitter.

8. The system of claim 7, wherein the VoIP service is configured to transfer the voice call from the designated channel to a secondary channel when the quality of the designated channel becomes degraded below a pre-determined threshold.

9. The system of claim 8, wherein the mobile communications device includes a control module configured to automatically answer a new voice call via the secondary channel, and suppress noticeable indications of the new voice call.

10. A method in an electronic communications system, the method comprising:
    initiating a voice call between a Voice over Internet Protocol (VoIP) service coupled to a mobile network and a wireless local-area network (WLAN) via a wide-area Internet protocol (IP) network and a mobile communications device;
    obtaining, from a Quality of Service (QoS) server, respective qualities of (i) a first data channel to the mobile communications device via the mobile network, (ii) a second data channel to the mobile communications device via the WLAN, and (iii) a voice channel to the mobile communications device via a public switched telephone network (PSTN);
    selecting a designated channel selected from the first data channel, the second data channel, and the voice channel based on the respective qualities of the first data channel, the second data channel, and the voice channel; and
    establishing, at the VoIP service, the voice call over the designated channel.

11. The method of claim 10, wherein determining the respective qualities comprises:
    sending and receiving data packets from a quality of service (QoS) server over a given data channel; and
    determining a quality of the given data channel based on at least one of: data packet loss, data packet latency, and data packet jitter.

12. The method of claim 10, wherein selecting the designated channel comprises selecting the second data channel as the designated channel when the quality of the second data channel exceeds a pre-determined threshold value.

13. The method of claim 10, wherein selecting the designated channel comprises selecting, from the first data channel and the second data channel, the channel having higher quality.

14. The method of claim 10, wherein selecting the designated channel comprises selecting the voice channel via the PSTN as the designated channel when the quality of the first and second data channels do not meet a pre-determined threshold value.

15. The method of claim 10, further comprising, when the voice call has been established over the designated channel, sending and receiving from a QoS server, heartbeat packets over the designated channel periodically during the voice call; and determining a real-time quality of the designated channel based on at least one of: heartbeat packet loss, heartbeat packet latency, and heartbeat packet jitter.

16. The method of claim 15, further comprising transferring the voice call from the designated channel to a secondary channel when the quality of the designated channel becomes degraded below a pre-determined threshold.

17. The method of claim 16, further wherein transferring the voice call comprises: automatically answering a new voice call via the secondary channel; and suppressing noticeable indications of the new voice call.

* * * * *